(12) United States Patent
Bergmeier

(10) Patent No.: US 9,675,005 B1
(45) Date of Patent: Jun. 13, 2017

(54) V-SLICE INSERT FOR ROW CROP PLANTERS

(71) Applicant: Shield Industries, Inc.

(72) Inventor: Mike J Bergmeier, Hutchinson, KS (US)

(73) Assignee: Shield Industries, Inc., Hutchinson, KS (US)

( * ) Notice: Subject to any disclaimer, the term of this patent is extended or adjusted under 35 U.S.C. 154(b) by 56 days.

(21) Appl. No.: 14/517,269

(22) Filed: Oct. 17, 2014

Related U.S. Application Data

(60) Provisional application No. 61/892,781, filed on Oct. 18, 2013.

(51) Int. Cl.
| | |
|---|---|
| *A01C 23/02* | (2006.01) |
| *A01B 49/06* | (2006.01) |
| *A01C 5/06* | (2006.01) |
| *A01C 21/00* | (2006.01) |

(52) U.S. Cl.
CPC ............ *A01C 23/025* (2013.01); *A01B 49/06* (2013.01); *A01C 5/062* (2013.01); *A01C 21/002* (2013.01)

(58) Field of Classification Search
USPC .................................. 111/119, 120, 123, 124
See application file for complete search history.

(56) References Cited

U.S. PATENT DOCUMENTS

| | | | |
|---|---|---|---|
| 2,439,743 A * | 4/1948 | McEwen | A01B 15/025 111/123 |
| 4,321,972 A | 3/1982 | Robertson et al. | |
| 4,565,141 A * | 1/1986 | Kopecky | A01C 5/062 111/124 |
| 4,598,654 A | 7/1986 | Robertson et al. | |
| 4,616,580 A * | 10/1986 | Moore | A01C 23/025 111/123 |
| 4,955,297 A | 9/1990 | Tsukamoto | |
| 5,159,985 A | 11/1992 | Rowlett | |
| D502,848 S | 3/2005 | Bergmeier | |
| 7,096,805 B1 | 8/2006 | Wiesenberger | |
| 7,128,007 B1 | 10/2006 | Wiesenberger | |
| 8,161,894 B1 * | 4/2012 | Albright | A01C 5/062 111/123 |
| 9,192,095 B1 * | 11/2015 | Bergmeier | A01C 23/025 |
| 2010/0154693 A1 * | 6/2010 | Bassett | A01C 5/064 111/123 |
| 2014/0158031 A1 * | 6/2014 | Hagny | A01C 5/06 111/121 |

* cited by examiner

*Primary Examiner* — Alicia Torres

(57) ABSTRACT

A v-slice insert for row crop planters includes a precision cast insert body which extends from an upper forward attachment end to a lower trailing end. The v-slice insert features a precision cast internal fertilizer tube receiving channel which protects a fertilizer tube, which, in turn delivers fertilizer to soil that eventually lies directly under planted seeds. The v-slice insert also includes a step feature near the fertilizer tube outlet to prevent the obstruction of the fertilizer tube with soil should the v-slice insert be moved in a reverse direction through soil during a turn. Further, side bulges in the sides of the v-slice insert fracture seed planting furrow side walls to facilitate closure of the furrow and complete covering of the planted seed.

14 Claims, 4 Drawing Sheets

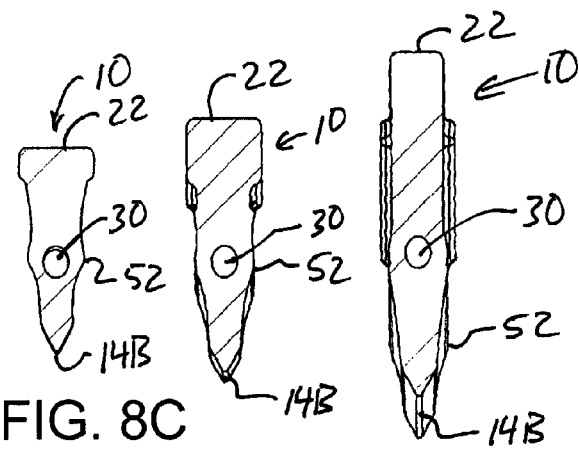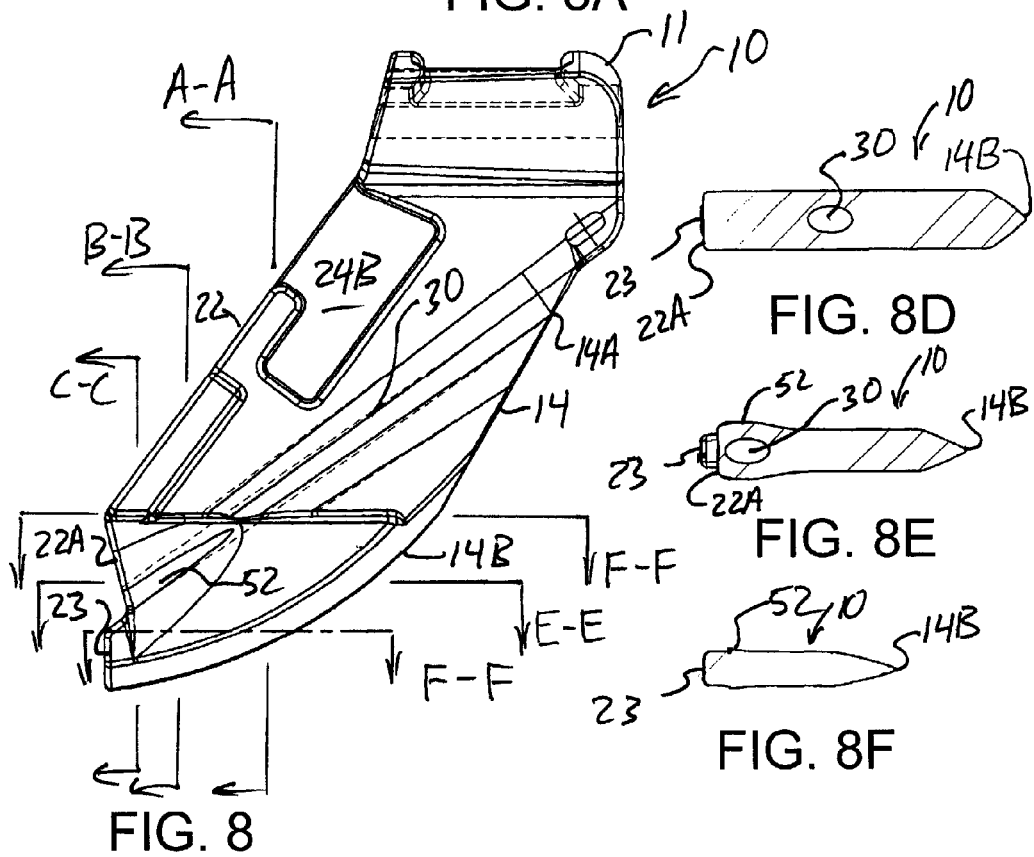

V-SLICE INSERT FOR ROW CROP PLANTERS

CROSS REFERENCE TO A RELATED APPLICATION

This application claims the benefit of U.S. Provisional Patent Application No. 61/892,781 filed on Oct. 18, 2013 which is incorporated herein by reference.

FIELD

This invention relates to V-Slice inserts for row crop planters.

BACKGROUND

Modern cultivators, or row crop planters cut spaced furrows, deposit seeds in those furrows and then close the furrows over the deposited seeds. In many instances, row crop planters will deposit small amounts of low rate starter fertilizer adjacent to the seeds to promote germination and initial growth. The essential objects of a row crop planter are to position seeds with uniform spacing, depth and access to a starter fertilizer. When these conditions occur, the crop plants will be more likely to emerge at the same time and initially grow at a uniform rate. Uniform emergence and uniform initial growth increases the likelihood that individual plants will tend to produce similar yields which will result in an optimum overall yield for the crop. The skilled reader will appreciate that modern cultivators are extensive, covering many rows, and they must move rapidly across a field in order to be productive. Thus, in very rapid succession, a furrow is opened and smoothed, a liquid low rate starter fertilizer is applied, a seed is deposited and the furrow is closed around the seed simultaneously across dozens of rows for hundreds or maybe even thousands of seeds per minute. And, still further, this is now often done in the highly challenging no-till or low-till context wherein forming a smooth, uniform planting furrow may be difficult. One skilled in the art will recall that in the industry, decades of research and development have been directed toward accomplishing these objects for optimum results.

Present row crop planters have a plurality of planting units. Each planting unit typically includes a pair of closely spaced rotating discs, a fertilizer tube, a seed tube and various rotating elements for closing the planting furrow. Some present row crop planting units include a v-slice insert which is placed between the discs. The discs are closely spaced apart transversely and have beveled edges which are turned toward the opposite disc. If the forward most portion of the each disc is understood as the nine o'clock position, then the discs nearly touch a approximately the eight o'clock position and diverge most at approximately the opposite two o'clock position. As the discs move through the soil, they break up the soil and create a furrow. A typical v-slice insert, when viewed from the side is shaped much like the prow of a boat. When viewed from the front, a v-slice insert resembles a thick, heavy blade. The forward end of the v-slice insert is located between the diverging discs and its lower edge is located low enough to shape a groove in the soil at the bottom of the unfinished furrow so that the bottom of the furrow has a V shape. It is into this V-shaped furrow bottom that a relatively a small quantity of starter fertilizer and evenly spaced seeds are deposited. Trailing rotating wheels or other similar devices press down on the soil surface and inwardly on either side of the furrow in order to close up the furrow.

The optimum planting process wherein seeds are planted in uniform straight rows, at a uniform depth, completely covered by properly compacted soil with starter fertilizer present in the soil immediately below the planted seeds is very difficult to achieve. Delivering small quantities of starter fertilizer to a zone immediately beneath each seed presents a difficult challenge. This is especially difficult because, in order position a liquid fertilizer tube near the bottom of a furrow is to also expose such a tube to wear and damage. Moreover, a fertilizer tube in close proximity to soil is susceptible to being plugged with dirt during a turn. Because of the extreme widths of modern seed planters, when a seed planter is turned at the end of each set of rows, the outboard planting units on the inside portion of the turn will actually reverse direction in the soil which will often cause the exposed discharge end of a liquid fertilizer tube to be clogged with dirt. This, in turn, leads to the non-uniform application of starter fertilizer and non-uniform emergence. Defining furrow walls that are not glassy but sufficiently fractured in order to crumble and collapse around the planted seeds when furrow closing pressure is applied is another difficult challenge. What is needed is a V-slice insert that facilitates the delivery of starter fertilizer to a zone immediately below the seed and which defines furrow walls which are more susceptible to collapse and crumbling for optimum seed coverage.

SUMMARY

A v-slice insert for row crop planters meets the above described needs with a cast v-slice insert which extends from an upper forward attachment end to a lower trailing end. The v-slice insert has a v-shaped leading edge and an internal fertilizer tube channel that extends from the upper forward end to a trailing surface which is located above the lower trailing end of the v-slice insert. The tube channel makes it possible to install a protected fertilizer tube having an outlet that is optimally positioned to deposit liquid starter fertilizer in a zone directly under the planted seeds. The lower trailing end of the v-slice insert may also present a rearwardly protruding step that breaks up and crumbles soil when the insert is moving in reverse through the soil. This feature prevents soil from compacting in the exposed discharge end of a fertilizer tube which is located near the outboard end of a planter when that planter pivots. The sidewalls of the insert body near the lower back portion of the insert body may also present generally symmetrical flared-out zones which bulge gradually outward. These flared-out zones reduce the compaction of the furrow sidewalls rendering them partially fractured and less stable. When the furrow is subjected to closing pressure, its partially fractured and less stable sidewalls are more susceptible to crumbling and collapse thereby providing better coverage above the planted seed after the furrow is closed.

BRIEF DESCRIPTION OF THE DRAWINGS

FIG. 8 is a side view of one embodiment of the v-slice insert.

FIG. 8A is a cut-away rear view of a one embodiment of the v-slice insert taken from plane A-A indicated in FIG. 8.

FIG. 8B is a cut-away rear view of one embodiment of the v-slice insert taken from plane B-B indicated in FIG. 8.

FIG. 8C is a cut-away rear view of one embodiment of the v-slice insert taken from plane C-C indicated in FIG. 8.

FIG. 8D is a cut-away top view of one embodiment of the v-slice insert taken from plane D-D indicated in FIG. 8.

FIG. 8E is a cut-away top view of one embodiment of the v-slice insert taken from plane E-E indicated in FIG. 8.

FIG. 8F is a cut-away top view of one embodiment of the v-slice insert taken from plane F-F indicated in FIG. 8.

DETAILED DESCRIPTION

Figure 1:
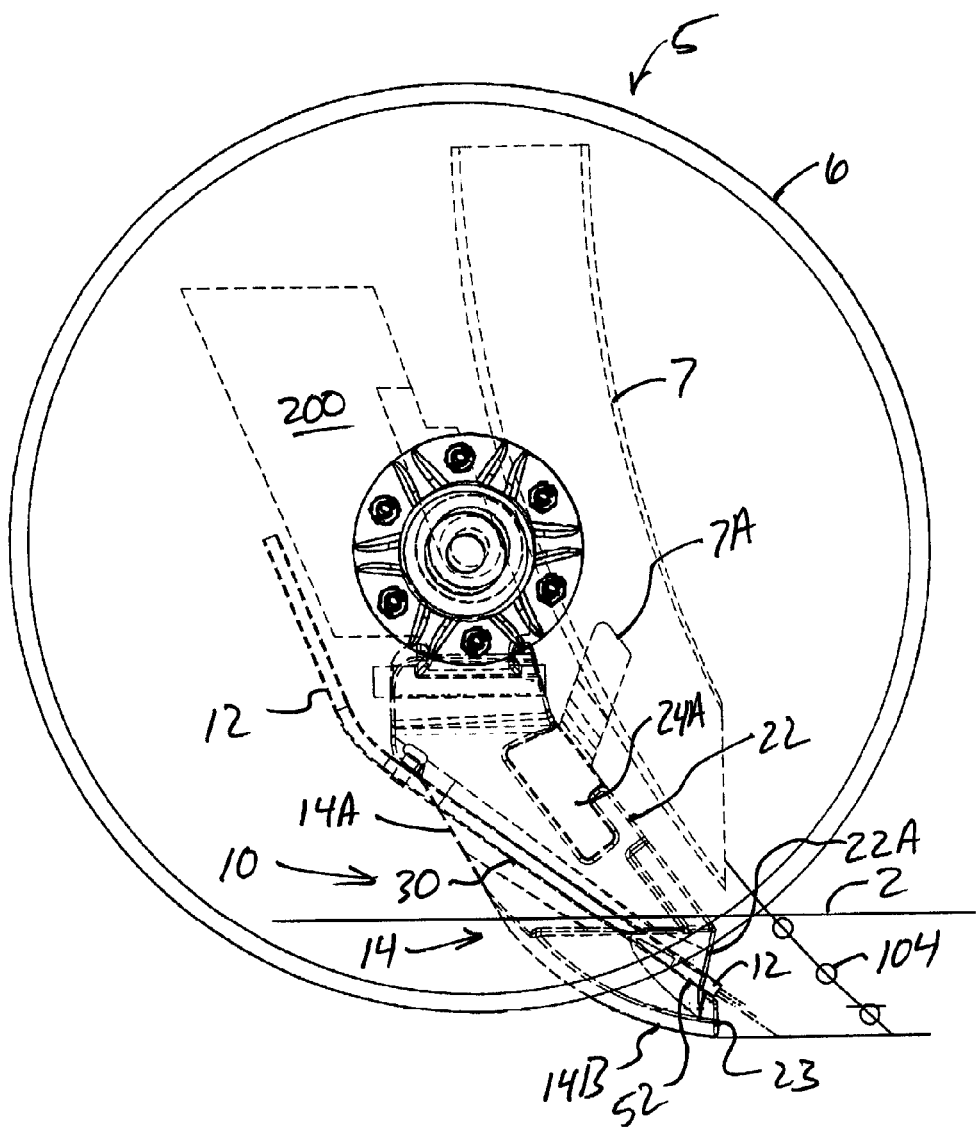
FIG. 1 is side view of one embodiment of a v-slice insert shown mounted in a planting unit.
Figures 2, 3, 3A, 3B:
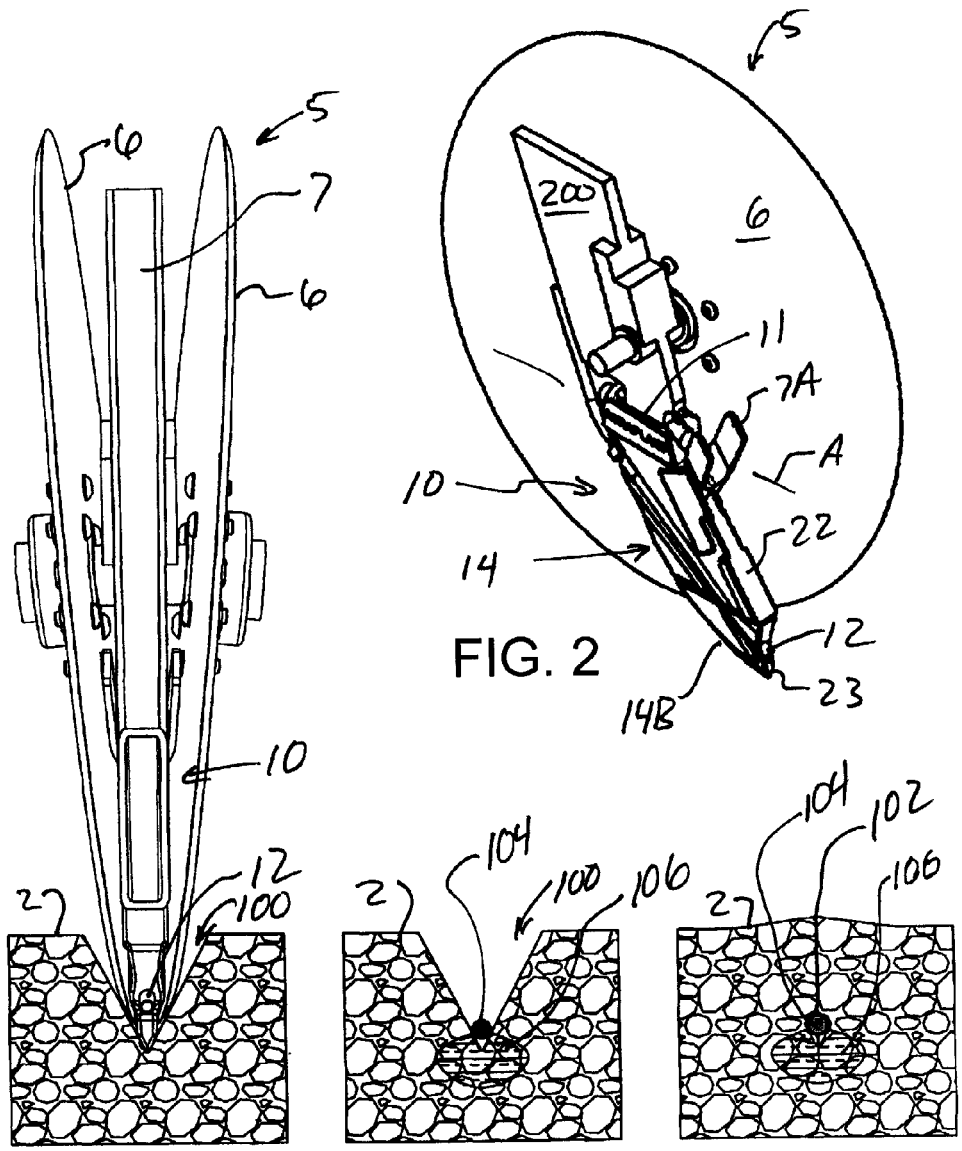
FIG. 2 is perspective view of one embodiment of the v-slice insert mounted in a planting unit shown with the left disc removed for clarity.
FIG. 3 is a rear view of one embodiment of the v-slice insert shown mounted in a planting unit with the v-slice insert shown placed in a soil furrow which is shown in cross section.
FIG. 3A is a cross section view a furrow showing a seed and a zone of liquid starter fertilizer as indicated in the drawing key shown with the furrow open prior to closing.
FIG. 3B is a cross section view of a furrow showing a seed and a zone of liquid starter fertilizer as indicated in the drawing key shown with the furrow closed.

Referring to the drawings, FIGS. 1 and 2 illustrates a seed planting unit 5 which is mounted to a row crop planter bracket 200. Row crop planter bracket 200 is a component of a row crop planter. The remaining portions of the row crop planter other than bracket 200 and planting unit 5 are not shown in FIGS. 1-8F. The row crop planter should be understood by the skilled reader as including a wheeled frame and a plurality of brackets 200 suitable for supporting a corresponding seed plurality of seed planting units 5. Seed planting unit 5 is mounted to bracket 200 and includes a pair of inclined discs 6, a seed tube 7 and a v-slice insert 10. As can be seen in FIG. 3, discs 6 have inwardly beveled outer rims which are beveled in the inboard direction. The outer rims of discs 6 preferably converge at a location that is between the seven and eight o'clock positions and diverge at a location that is between the one and two o'clock positions. The skilled reader will note that the six o'clock position indicates straight down, the nine o'clock position indicates forward and so on. As can be seen in FIG. 1, V-slice insert 10 is suspended from bracket 200 between discs 6 so that the body of v-slice insert 10 extends back and down to define an angle of approximately 60° with the soil surface 2 so that v-slice insert 10 emerges from between discs 6 generally between the four o'clock and six o'clock positions. A liquid fertilizer tube 12 is received by a channel 30 in v-slice insert 10 as will be described in greater detail below.

In this example, seed tube 7 is also carried by planting unit 5 and is supported by a seed tube bracket 7A which is attached to v-slice insert 10. Seed tube 7 is located and angled in order to deposit seeds in the furrow formed by discs 6 and insert 10 behind discs 6 and v-slice insert 10 as they move through the soil. This action forms a furrow 100 shown in FIGS. 3, 3A and 3B. Furrow closing wheels and discs which are not shown trail behind seed tube 7 and operate to close the furrow created by discs 6 and v-slice insert 10. As can be seen in FIGS. 2A and 2B a zone of liquid starter fertilizer 106 is deposited by fertilizer tube 12 immediately beneath seed 104.

Figure 4:
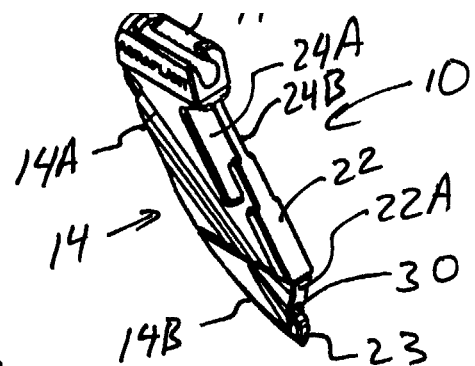
FIG. 4 is a perspective view of a one embodiment of the v-slice insert.
Figure 6:
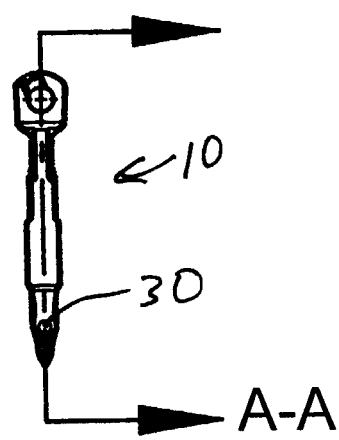
FIG. 6 is a rear view of one embodiment of the v-slice insert.
Figure 7:
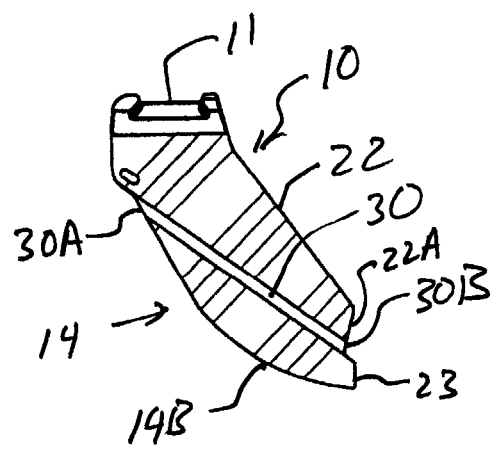
FIG. 7 is a cut-away side view of one embodiment of the v-slice insert taken from plane A-A indicated in FIG. 6.

In this example, V-slice insert 10 is preferably a solid cast part fashioned from chromium cast iron or an equivalent material with a high degree of wear resistance. The solid cast part for v-slice insert 10 may be considered as a v-slice insert body 11. As can be seen in FIG. 1 and FIG. 4, in this example, v-slice insert 10 has an upper mounting portion 11 for mounting v-slice insert 10 to a planting unit 200. However, other row crop planting implements may require other configurations. The body of v-slice insert 10 has a leading edge 14 and a trailing edge 22. In this example, upper mounting portion 11 is configured to pivotably mount v-slice insert 10 to a planting unit 200 so that v-slice insert 10 is able to pivot at least slightly from side to side about longitudinal axis A which is indicated in FIG. 1A. (Another type of row crop planter may require a different mounting geometry for v-slice insert 10, but usually, the interface will permit similar side to side pivoting.) This feature allows v-slice insert 10 to pivot around an obstacle such as a buried rock or the like. Most of trailing edge 22 in this example is a narrow flat surface which is oriented at approximately a 60° angle with respect to soil surface 2. However, the lower portion of trailing edge 22, namely lower portion 22A, which, in this example is also a flat surface, is generally upright but tilted slightly forward. The bottom end of lower portion 22A presents a step 23 which will be discussed in greater detail below. Leading edge 14 includes an upper leading edge portion 14A and a curved lower leading edge portion 14B. Upper leading edge portion 14A is at slightly steeper angle than the trailing edge 22 but is still generally aligned with the body of v-slice insert 10. Because upper leading edge portion 14A does not engage the soil in order to shape a planting furrow, upper leading edge portion 14A may be generally flat as can be seen by referring to FIG. 6. However, the curved lower leading edge portion 14B has a v-shaped cross section as can be seen in FIG. 6 and FIGS. 6A-6F. Lower leading edge portion 14B describes an arc segment so that at its upper end it is almost parallel to trailing edge 22 and almost horizontal at its lower end. This v-shaped leading edge is crucial for shaping the very bottom of the furrow in order to receive a seed such as a corn kernel in an optimum position (which is, according to agronomist a position wherein the corn kernel lays on edge and on its side).

Figure 5:
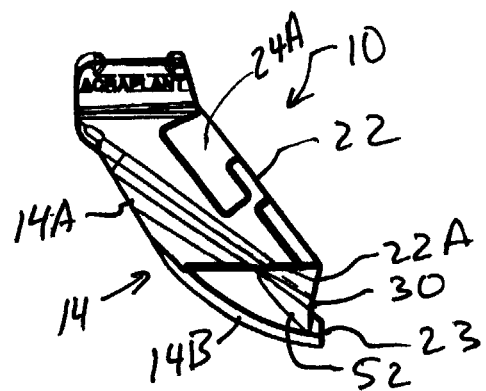
FIG. 5 is a side view of one embodiment of the v-slice insert.

As can be best seen in FIGS. 4 and 5, the opposite sides of v-slice insert 10 have seed tube bracket recesses 24A and 24B. These recesses receive the opposite sides of a flexible plastic clip structure 7A that is used to support seed tube 7. Seed tube 7 is not part of the subject matter of this application. However, it may be useful to note seed tube 7 is an ingeniously designed light weight hollow plastic channel which controls the deposition of seeds with surprising accuracy. The seeds bounce down the tube and somehow, especially in the case of corn kernels, nearly always land in the optimum orientation described above if a well formed v-shaped furrow is present to receive them.

An important feature of v-slice insert 10 is a fertilizer tube channel 30 which extends from an inlet 30A at the upper end of leading edge 14 to an outlet 30B in lower portion 22A of trailing edge 22 at a location immediately above step 23. In this example, fertilizer tube channel 30 is a cylindrical channel which is precision cast into v-slice insert 10 when v-slice insert 10 is cast. Tube channel 30 is suitable for receiving and protecting a flexible plastic starter fertilizer tube 12 which is shown in FIG. 1. Fertilizer tube 12 is connected to a source of starter fertilizer which is not shown. Tube 12 is protected by v-slice insert 10 so that no portion of it comes in contact with moving soil as the planting unit progresses across a field. The location of outlet 30B of fertilizer tube channel 30 is particularly advantageous. From this protected location, liquid starter fertilizer can be applied to the bottom of the furrow immediately ahead of the location where seed tube 7 will deposit a seed. This results in liquid starter fertilizer 106 being present immediately below the seed when the furrow is closed a fraction of a second after the seed is deposited as is shown in FIGS. 2A and 2B.

Another important feature of v-slice insert 10 is step 23 which is referred to above. As noted above, step 23 is at the lower end of lower portion 22A of trailing edge 22. Step 23 is a projecting area that juts out immediately below the outlet of tube channel 30. The purpose of step 23 is to prevent soil from clogging the outlet end of fertilizer tube 12 when insert 10 is moving through the soil in a reverse direction. The skilled reader will recall that a planting implement typically covers upwards of 18 rows and in some cases as many as 36 rows. (Even greater numbers of rows may be present in a planting implement). Most likely, the planting implement is pulled by a tractor which has a turning point located well ahead of the implement. Thus, when a reverse turn (a U-turn) is executed at the ends of a set of rows, inevitably, a v-slice insert positioned on the inside portion of the turn will be moved backward into the soil. When this occurs, step 23 encounters the soil and breaks it up before it reaches the outlet of tube channel 30 and tube 12. If none of the fertilizer tubes of a row crop planter are obstructed, then the row crop planter will uniformly apply starter fertilizer to all of the rows being planted. The Uniform application of starter fertilizer promotes the uniform emergence and growth of plant seedlings.

Yet another important feature of v-slice insert 10 is a pair of symmetrical flared-out zones 52 that flare outward from the lower back portions of the side surfaces of the insert body. As can be seen in FIGS. 8D-8F, in this example, flared-out zones 52, when considered in the horizontal direction, gradually flare outward toward the back end of v-slice insert 10 reaching a maximum thickness at the lower portion 22A of trailing edge 22 around the outlet of tube channel 30. As can be seen in FIGS. 8A-8C, in this example, flared-out zones 52 generally increase in thickness as the cross section shifts from the upper extent of flared-out zones 52 toward the center of flared-out zones 52 and then decreases in thickness at the lower extent of flared-out zones 52. Accordingly, flared-out zones 52 present bulged out or flared-out surfaces. These flared-out surfaces operate to partially fracture the sidewalls of furrow 100 (shown in FIG. 3A) of the planting furrow and to prevent the formation of smoothed or trowelled furrow sidewalls. Such formed, compacted sidewalls often have enough structural integrity to remain intact even after the furrow is closed. This can result in leaving a fissure in the soil directly above the plated seed or air pockets proximate to the planted seeds, both of which are agronomically undesirable. By preventing the formation of smoothed, furrow sidewalls, v-slice insert 10, increases the likelihood that upon closing, the walls of the planting furrow will crumble so that planted seeds will have uniform soil coverage and will not be in compromised by voids, fissures or air pockets.

As can be seen from the above description, v-slice insert 10 enhances the performance of a planting implement. Because of fertilizer tube channel 30, liquid starter fertilizer is delivered to a zone immediately below the planted seed. The presence of step 23 prevents the introduction of fertilizer tube obstructing soil during sharp turns at the end of planting rows. And, flared out portions 52 prevent furrow sidewall compaction which increases the likelihood of optimum soil coverage for planted seeds.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A v-slice insert for use with a row crop planter, the row crop planter being of the type having a pair of inclined discs suitable for creating a furrow, the row crop planter also being of a type having a seed tube, the v-slice insert comprising:
a v-slice insert body having a leading edge and a trailing edge and sidewalls extending between the leading edge and the trailing edge, the leading edge presenting a lower leading edge portion that curves rearwardly thereby extending from the leading edge of the insert body to the trailing edge of the insert body, the v-slice insert body presenting a fertilizer tube channel, the fertilizer tube channel extending from an inlet defined in the leading edge of the insert body to an outlet that is defined in the trailing edge of the insert body at a location which is above the lower end of the trailing edge of the insert body, the fertilizer tube channel suitable for receiving and protecting a fertilizer tube, the fertilizer tube, when received by the fertilizer tube channel, being located for delivering fertilizer to preselected location in the soil, the v-slice insert being arranged such that when the v-slice insert is mounted between the discs of the row crop planter, the lower leading edge portion of the leading edge of the v-slice insert extends below the discs of the row crop planter, the lower leading edge of the leading edge of the v-slice insert also being located in relation to the discs and being shaped so that the v-slice insert is able to draft through soil at the bottom of a furrow formed by the discs of the row crop planter and thereby shape the bottom of the furrow, the resulting furrow formed by the discs and the v-slice insert, suitable for receiving fertilizer from the fertilizer tube and seeds from the seed tube in rapid succession.

2. The v-slice insert of claim 1, wherein:
the lower trailing edge of the v-slice insert body also presents a rearwardly protruding step immediately below the outlet end of the fertilizer tube channel, the protruding step operable for breaking and crumbling soil when the v-slice insert is moving in a reverse direction through the soil for preventing the introduction of soil into a fertilizer tube carried by the tube channel.

3. The v-slice insert of claim 1, wherein:
the lower back portions of the sidewalls of the v-slice insert body present flared out portions operable for fracturing the soil of a planting furrow to facilitate the crumbling of the soil of a planting furrow over planted seeds when the planting furrow is closed by the row crop planter.

4. The v-slice insert of claim 2, wherein:
the lower back portions of the sidewalls of the v-slice insert body present flared out portions operable for fracturing the soil of a planting furrow to facilitate the crumbling of the soil of a planting furrow over planted seeds when the planting furrow is closed by the row crop planter.

5. A v-slice insert for use with a row crop planter, the row crop planter being of the type having a pair of inclined discs which are able to rotate about disc centers and a seed tube for delivering seeds, the v-slice insert comprising:
a precision cast v-slice insert body having a leading edge and a trailing edge and sidewalls extending between the leading edge and the trailing edge, the leading edge presenting a lower leading edge portion that curves rearwardly thereby extending from the leading edge of the insert body to the trailing edge of the insert body, the v-slice insert body presenting a fertilizer tube channel, the fertilizer tube channel extending from an inlet defined in the leading edge of the insert body to an outlet that is defined in the trailing edge of the insert body at a location which is above the lower end of the trailing edge of the insert body, the fertilizer tube channel suitable for receiving and protecting a fertilizer tube, the fertilizer tube, when received by the fertilizer tube channel, being located for delivering fertilizer to pre-selected location in the soil, the v-slice insert being arranged such that when the v-slice insert is mounted between the discs of the row crop planter, the lower leading edge portion of the leading edge of the v-slice insert extends below the discs of the row crop planter, the lower leading edge of the leading edge of the v-slice insert also being located in relation to the discs and being shaped so that the v-slice insert is able to draft through soil at the bottom of a furrow formed by the discs of the row crop planter and thereby shape the bottom of the furrow, the resulting furrow formed by the discs and the v-slice insert, suitable for receiving fertilizer from the fertilizer tube and seeds from the seed tube in rapid succession.

6. The v-slice insert of claim 5, wherein:
the lower trailing edge of the v-slice insert body also presents a rearwardly protruding step immediately below the outlet end of the fertilizer tube channel, the protruding step operable for breaking and crumbling soil when the v-slice insert is moving in a reverse direction through the soil for preventing the introduction of soil into a fertilizer tube carried by the tube channel.

7. The v-slice insert of claim 5, wherein:
the lower back portions of the sidewalls of the v-slice insert body present flared out portions operable for fracturing the soil of a planting furrow to facilitate the crumbling of the soil of a planting furrow over planted seeds when the planting furrow is closed by the row crop planter.

8. The v-slice insert of claim 6, wherein:
the lower back portions of the sidewalls of the v-slice insert body present flared out portions operable for fracturing the soil of a planting furrow to facilitate the crumbling of the soil of a planting furrow over planted seeds when the planting furrow is closed by the row crop planter.

9. The v-slice insert of claim 5, wherein:
the v-slice insert body is cast from chromium cast iron.

10. The v-slice insert of claim 9, wherein:
the lower trailing edge of the v-slice insert body also presents a rearwardly protruding step immediately below the outlet end of the fertilizer tube channel, the protruding step operable for breaking and crumbling soil when the v-slice insert is moving in a reverse direction through the soil for preventing the introduction of soil into a fertilizer tube carried by the tube channel.

11. The v-slice insert of claim 9, wherein:
the lower back portions of the sidewalls of the v-slice insert body present flared out portions operable for fracturing the soil of a planting furrow to facilitate the crumbling of the soil of a planting furrow over planted seeds when the planting furrow is closed by the row crop planter.

12. The v-slice insert of claim 10, wherein:
the lower back portions of the sidewalls of the v-slice insert body present flared out portions operable for fracturing the soil of a planting furrow to facilitate the crumbling of the soil of a planting furrow over planted seeds when the planting furrow is closed by the row crop planter.

13. The v-slice insert of claim 1, wherein:
the lower leading edge of the v-slice insert is v-shaped for forming a v-shaped portion at the very bottom of the furrow which is formed by the discs and the v-slice insert.

14. The v-slice insert of claim 5, wherein:
the lower leading edge of the v-slice insert is v-shaped for forming a v-shaped portion at the very bottom of the furrow which is formed by the discs and the v-slice insert.

* * * * *